June 9, 1959  J. H. REYNOLDS  2,889,889
LOW BEAM ADJUSTABLE CULTIVATOR
Filed Feb. 14, 1958  2 Sheets-Sheet 1
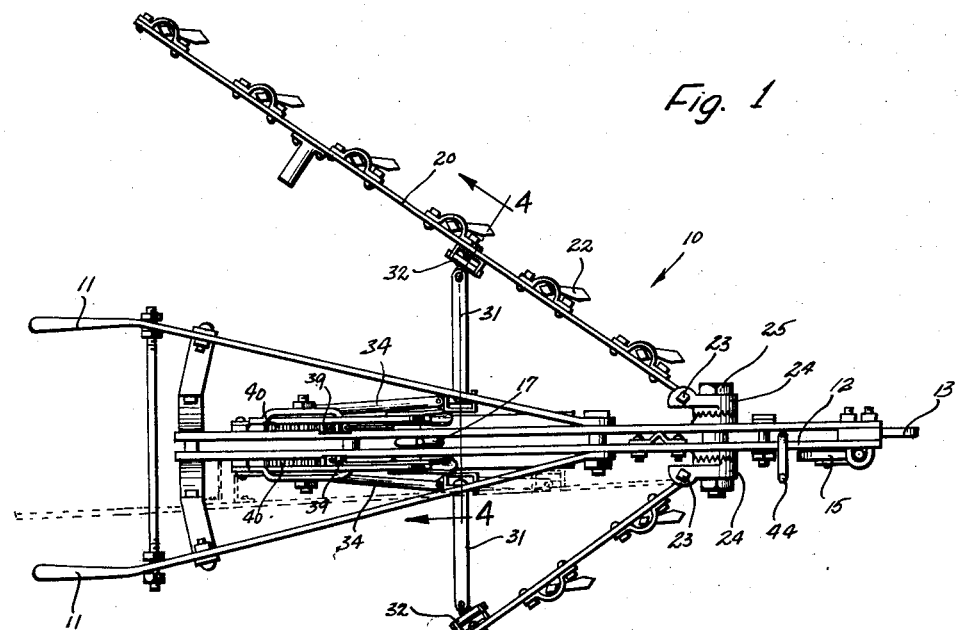
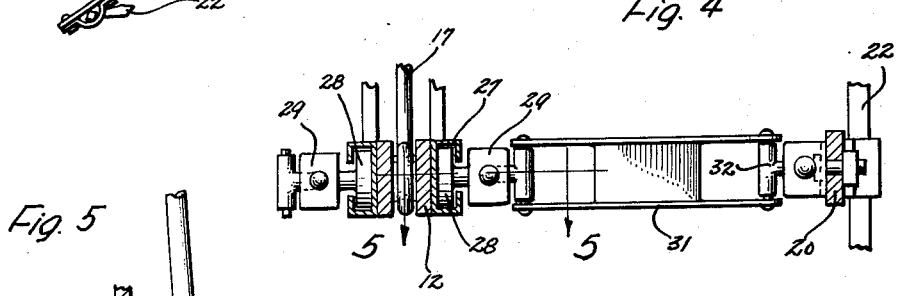
INVENTOR
John H. Reynolds

United States Patent Office 2,889,889
Patented June 9, 1959

2,889,889
LOW BEAM ADJUSTABLE CULTIVATOR
John H. Reynolds, Homedale, Idaho
Application February 14, 1958, Serial No. 715,356
4 Claims. (Cl. 172—354)

This invention relates to farm implements and more particularly to cultivators.

It is an object of the present invention to provide a single row cultivator that may be used for all row crops such as corn, cotton, peanuts, and the like.

Another object of the present invention is to provide a combination horse drawn and tractor drawn cultivator that may be manually adjusted for the width of the particular row of crops being cultivated and which has self contained level adjustment means.

Still another object of the present invention is to provide an adjustable single row cultivator of the above type that is particularly useful on farms and in gardens having row crops in which the rows are of varying widths, and which may be equally as well drawn by horse and tractor alike.

Other objects of the invention are to provide an adjustable cultivator bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a top plan view of a cultivator made in accordance with the present invention in operative use;

Figure 4 is an enlarged fragmentary cross sectional view taken along line 4—4 of Figure 1; and Figure 5 is an enlarged fragmentary cross sectional view taken along line 5—5 of Figure 4.

Figure 2:
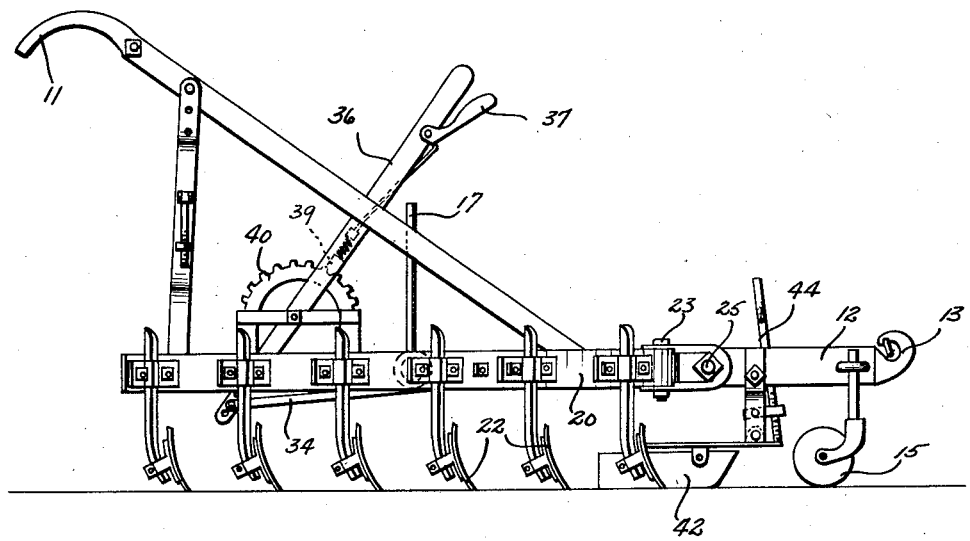
Figure 2 is a side elevational view of the device shown in Figure 1.
Figure 3:
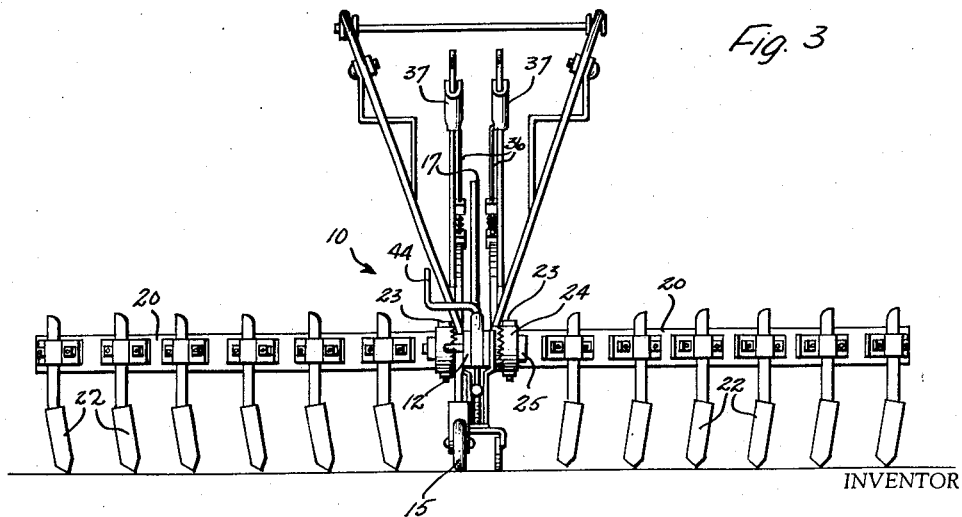
Figure 3 is a front elevational view of the device shown in Figure 2.

Referring now more in detail to the drawing, and more particularly to Figures 1 to 3 thereof, an adjustable cultivator 10 made in accordance with the present invention is shown to include a longitudinal mid rib 12 having a pair of handles 11 secured at one end and a drawer hook 13 at the forward end. A guide wheel 15 is rotatably supported beneath the forward end of the mid rib, while an upright staff 17 is secured to the center portion of the mid rib for mounting the cultivator upon a tractor.

A pair of rearwardly diverging wing pieces 20 having depending teeth 22 are pivotally supported at their forward ends upon vertical bolts 23 for selective rotational movement between the extreme position shown in Figure 1 and an adjusted position spaced closer to the mid rib 12. As is more clearly shown in Figure 1 of the drawing, the pivot bolts 23 are carried upon bearing members 24 which are secured in a selected rotationally adjusted position upon the mid rib by means of a nut and bolt assembly 25.

Referring now more specifically to Figures 4 and 5 of the drawing, it will be noted the mid section of the mid rib 12 is provided with a pair of outwardly opening longitudinally disposed channel members 27 having inwardly turned flanges for slidably supporting the lugs 28 of bearing assemblies 29 for reciprocating longitudinal movement. These bearing assemblies are connected to the inner ends of throw links 31, while the outer ends thereof are connected to universal joints 32 which are secured to the central portion of the wing pieces 20. A pair of longitudinally extending pull rods 34 are connected at one end to the respective bearing pieces 29 and at the opposite end to the lower extremity of levers 36 which are supported at their mid sections upon the mid rib 12. The opposite free ends of these levers or links 36 have handles 37 that actuate associated pawls 39 for selective engagement with selective ones of the teeth of toothed segments 40. It will thus be recognized that in response to rotation of the links or levers 36 about their pivotal connection upon the mid rib 12, that the longitudinal movement of the associated pull rod 34 will be transmitted to the longitudinally movable bearing assemblies 29, thus adjusting the throw links 31 to move the wing pieces 20 inwardly or outwardly, as the case may be, so as to accommodate a narrower or wider row of crops.

Referring now to Figure 2 of the drawing, it will be noted that a level adjustment skid 42 is disposed intermediate the forward ends of the wing pieces 20 and the guide wheel 15. Thus, in response to the adjustment of the threaded shaft 44, the particular level of the cultivator may be simply adjusted so as to control the depth of drag of the teeth 22.

While the various controls and means for adjusting the various operations of this cultivator are rather simple and easily manipulated, the cultivator is particularly useful for cultivating rows of crops of varying widths. All that is required is to adjust the position of the levers 36 to adjust the position of the wing pieces to suit the requirements of any particular row.

While various changes may be made in the detail construction, it shall be understood that such changes shall be within the spirit and scope of the present invention as defined by the appended claims.

What I claim as new and desire to protect by Letters Patent is:

1. An adjustable single row cultivator comprising a mid rib having a draw hook at one forward end and a pair of handles at the opposite rear end, a guide wheel rotatably carried by the front end of said mid rib, a pair of rearwardly diverging pieces pivotally connected at the forward ends to said mid rib, means for adjusting the angle of spread of said wing pieces, means adjacent to said guide wheel for adjusting the level of said cultivator, said mid rib including a pair of flanged channel members opening in a direction toward said wing pieces, a pair of throw links each having a lug at one end slidably supported within one of said channel members and having a universal joint at the opposite end connected to one of said wing pieces.

2. The combination according to claim 1, wherein said means for adjusting the angle of spread of said wing pieces comprises a pair of rods each one connected to one of said lugs for reciprocating longitudinal movement relative to said channel.

3. The combination according to claim 2, further comprising a pair of levers each pivotally supported at a mid portion upon said mid rib, one end of each of said levers comprising a handle, and the other end of said levers being pivotally connected to said rods.

4. The combination according to claim 3, further comprising a pair of toothed segments carried by said mid rib, and a pawl carried by each of said levers for engagement with said segments for releasably securing said levers in an adjusted position.

References Cited in the file of this patent
UNITED STATES PATENTS

| | | |
|---|---|---|
| 509,857 | Allen | Dec. 5, 1893 |
| 1,439,579 | Roach | Dec. 19, 1922 |

FOREIGN PATENTS

| | | |
|---|---|---|
| 260,479 | Switzerland | July 16, 1949 |